Patented Nov. 2, 1943

2,333,384

UNITED STATES PATENT OFFICE 2,333,384

ARYLAMINOANTHRAQUINONE COMPOUND

David X. Klein, Wilmington, Del., assignor to E. I. du Pont de Nemours & Company, Wilmington, Del., a corporation of Delaware No Drawing. Application September 25, 1941, Serial No. 412,288

3 Claims. (Cl. 260—376)

This invention relates to the production of new and valuable arylaminoanthraquinone compounds and more particularly to the preparation of 1-hydroxy-4-arylaminoanthraquinones which carry in the aryl ring the radical OR, wherein R stands for a substitutent of the group consisting of —CH$_2$COOH, —CH$_2$CH$_2$OH, —CH$_2$COOCH$_3$ and —CH$_2$COOC$_2$H$_5$, which compounds are particularly valuable as dyes for cellulose esters and ethers and for the coloring of organic plastic masses. On sulfonation these compounds are rendered substantive to and may be employed as dyes for animal and related fibers.

Many of the dyes of the cellulose acetate class which have good affinity for that material have been found to be deficient in their fastness to gas fumes, i. e., to the fumes existing in the atmosphere resulting from the burning of coal gas and the like, which causes a material change of the color of the dye on the cellulose acetate. It is known that the 1-hydroxy-4-anilinoanthraquinone and the corresponding 1-hydroxy-4-paratoluidinoanthraquinone have no affinity for cellulose acetate although when incorporated into such material while it is in plastic form before spinning these color compounds show excellent fastness to gas fumes.

It is an object of the present invention to provide dyestuffs for cellulose acetate and related fibers which have excellent gas fume fastness and which will be substantive to the cellulose acetate fibers.

It is a further object of the invention to provide a process for producing 1-hydroxy-4-arylaminoanthraquinones from quinizarine and leuco quinizarine in relatively pure form and in a simple and economical manner.

I have found that when one mole of phenylamines which carry in the phenyl group the radical OR in which R is —CH$_2$COOH, —CH$_2$CH$_2$OH, —CH$_2$COOCH$_3$ and —CH$_2$COOC$_2$H$_5$ is reacted with a mixture of quinizarin and leuco quinizarin so that one free hydroxy group remains in the anthraquinone nucleus, compounds are produced which dye cellulose acetate and related fibers in violet shades of excellent fastness to gas fumes.

While it has been known that the condensation of leuco quinizarin with phenylamines in the presence of boric acid using an excess of phenylamine produces di-condensation products, and that a similar condensation carried out in the absence of boric acid but in the presence of a weaker condensing agent (such as acetic or mineral acid) gives mono-condensation products, we have found that the condensation of leuco quinizarin with phenylamines when the latter are used only in slight excess of that theoretically required and the reaction is carried out in the presence of boric acid and a solvent such as an alcohol or water or a mixture of the same in the presence of boric acid the mono-condensation product is obtained in relatively high yields and purity. The amount of excess of the phenylamine required depends upon the reactivity of the particular phenylamine and may vary from 10% to approximately 100% in excess of theory. The ratio of the phenylamine to the solvent employed should be preferably 1.1 mole to approximately 4.18 parts of solvent. The use of from 4 to 5 parts of solvent, i. e., alcohol and/or water per part of quinizarin and leuco quinizarin combined has been found to give very satisfactory results where the amount of amine employed does not exceed that which has been found to give complete monoarylamination of the quinizarin. The reaction will usually come to completion within 12 hours after reaching reaction temperature although with very reactive amines a shorter time is required.

Methyl and ethyl alcohols are preferred as diluents in the reaction although water with alcohol or a mixture of alcohols operates satisfactorily. The solvents should have a low solvent power for the products of the reaction and they should be miscible with water. The ratio of leuco quinizarin to quinizarin should be preferably in the ratio of 1 to 4. When the ratio of solvent to the leuco quinizarin and quinizarin combined exceeds approximately 4.18 to 1 a corresponding increase in the amount of amine employed is generally desirable.

The following examples are given to illustrate the invention. The parts used are by weight.

*Example 1*

9.6 parts of quinizarin (100%), 2.6 parts of leuco quinizarin (100%), 6 parts of boric acid, 6.5 parts of p-aminophenol and 50 parts of 95% ethyl alcohol are heated to 78° C. for 12 hours. The reaction product, after diluting with alcohol is filtered off, washed with alcohol and finally with water. The crude cake is then boiled up with 400 parts of a 7% sodium hydroxide solution, filtered and washed alkali free with hot water. On drying, 1-hydroxy-4-(4'-hydroxyanilino)-anthraquinone having a melting point of 254° C. and a N-content of 4.08% is obtained in a high yield.

It dyes cellulose acetate in reddish-blue shades of good strength and of excellent fastness to gas fumes.

*Example 2*

8.25 parts of quinizarin, 2.3 parts of leuco quinizarin and 6 parts of boric acid are added to a solution formed by mixing 10 parts of p-(beta - hydroxyethoxy) - aniline - hydrochloride and 2 parts of sodium hydroxide in 40 parts of 95% ethyl alcohol. After heating at 78° C. for 12 hours, the mass is cooled, filtered and worked up as in Example 1. The 1-hydroxy-4-(p-beta-hydroxyethoxy-anilino)-anthraquinone is obtained in high yields having a melting point of 167° C. and a nitrogen content of 3.86%. It dyes cellulose acetate in reddish-blue shades of excellent fastness to gas fumes.

*Example 3*

9.4 parts of quinizarin, 2.6 parts of leuco quinizarin, 11.7 parts of 4'-aminophenoxy acetic acid ethyl ester, 6 parts of boric acid, and 50 parts of 95% denatured ethyl alcohol are refluxed together for 12 hours. The precipiated product is filtered, and washed with water. The cake which is the 1 - hydroxy-4-phenylaminoanthraquinone which carries in the paraposition of the phenylamine group the radical -O-CH$_2$-COOC$_2$H$_5$ is then treated with 400 parts of a 7% sodium hydroxide solution at the boil, filtered, and the filtrate acidified.

The product of the following formula is obtained which dyes cellulose acetate in violet shades:

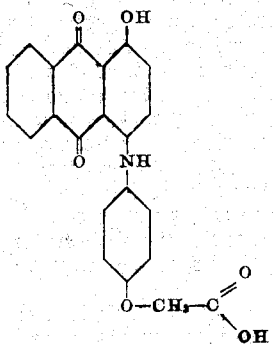

*Example 4*

When the reaction as described in Example 3, is carried out and the product is treated with 400 parts of a 2½% sodium carbonate solution at room temperature in place of the sodium hydroxide solution at the boil and the suspension is filtered from a small amount of hydrolyzed product and washed further with dilute sodium carbonate solution and finally water, a product of the formula is obtained which has a melting point of 133.9° C. and a nitrogen content of 3.39%.

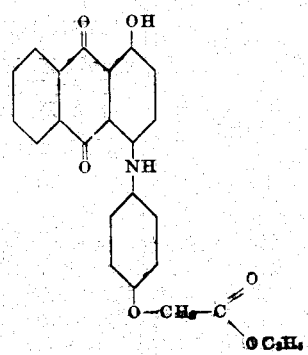

It dyes cellulose acetate in violet shades.

I claim:
1. Compounds of the general formula

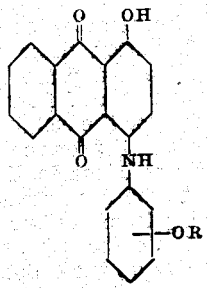

in which R stands for a substituent of the group consisting of -CH$_2$-COOH, -CH$_2$-CH$_2$-OH, CH$_2$COOCH$_3$ and CH$_2$-COOC$_2$H$_5$, which compounds dye cellulose acetate in violet shades fast to gas fumes.

2. 1-hydroxy - 4 - (p-beta-hydroxyethoxy anilino)-anthraquinone.

3. 1 - hydroxy - 4 - phenylaminoanthraquinone which carries in the 4'-position the -O-CH$_2$-COOCH$_3$ radical.

DAVID X. KLEIN.